Patented Aug. 20, 1946

2,406,307

UNITED STATES PATENT OFFICE 2,406,307

ANTICORROSIVE PAINT

Norman John Read, Greenford, England, assignor to Goodlass Wall & Lead Industries Limited, Oxted, Surrey, England No Drawing. Application March 9, 1945, Serial No. 581,942. In Great Britain February 11, 1944

9 Claims. (Cl. 106—14)

This invention relates to lead pigment paints, particularly for the protection of iron and steel.

It is well known that certain pigments used in oil paints exhibit marked anti-corrosive effects upon iron and steel.

I have now found that those plumbates of the alkaline earth metals, in which substantially all of the lead is in the form of lead peroxide combined with an alkaline earth metal oxide have very desirable pigmentary properties, particularly in protecting iron and steel against corrosion. They have also been found to have the desirable properties of high obliterating power, good stability in paint form and oil absorption values which permit the manufacture of paints of high pigment content.

These pigments range in colour from substantially white, through buff and chocolate to black. Thus for example, barium plumbate, in addition to its protective value, provides a new black pigment completely inorganic in composition and of such an oil absorption that relatively highly pigmented paints can be made from it. This characteristic is particularly valuable in the production of flat black paints.

The invention accordingly provides a paint, comprising as a pigment constituent a plumbate of an alkaline earth metal, in which substantially the whole of the lead is in the form of lead peroxide combined with an oxide of an alkaline earth metal.

I prefer to manufacture the alkaline earth metal plumbate by the known reaction which consists in heating together in air an oxide of the alkaline earth metal (or a salt thereof such as a nitrate, a carbonate or the like which will produce an oxide of the alkaline earth metal on heating) and an oxide of lead, e. g. litharge or red lead, or a salt of lead which will produce a lead oxide or lead oxides on heating.

My experiments as so far conducted have shown that, in the case of calcium and strontium plumbates, the proportions of alkaline earth metal oxide and lead oxide should approximate to those required theoretically for the production of the ortho-plumbate $Ca_2PbO_4$, and that if the proportions are such as to approach those required theoretically for the production of the meta-plumbate $CaPbO_3$, a considerable proportion of the lead in the resulting product is not in the form of $PbO_2$ combined with the alkaline earth metal oxide and the material is unsuitable for use as a pigment. Surprisingly enough, however, this does not apply in the case of the product from the heating together of BaO and PbO, or compounds which produce these oxides on heating. The material so obtained contains substantially the whole of the lead present in the form of combined $PbO_2$ not only when the proportions of oxides used correspond to those required for the production of the ortho-plumbate but also when they approximate to those required for the production of the meta-plumbate, and may therefore be regarded as a plumbate intermediate between ortho and meta, or a mixture of ortho and meta.

The constitution of the alkaline earth metal plumbates is not at present fully understood, but only those plumbates in which at least 90% by weight of the lead present is in the form of combined $PbO_2$ are suitable for my purpose, and I prefer to employ plumbates in which more than 90% of the lead is in the form of combined $PbO_2$. This is because any uncombined $PbO_2$ tends to revert to PbO, and the presence of any considerable proportion of free PbO in the material causes the manufactured paint to stiffen and become unuseable; such effect of free PbO in lead paints is well known.

I find that when the plumbates are manufactured by the above-indicated process, and carried out at a temperature of around 750° C., the resulting product consists, except in the case of barium plumbate, of a fine soft powder suitable for direct incorporation in paints.

The alkaline earth metal plumbate according to the invention can be employed in conjunction with other pigments, e. g. iron oxide, to improve the protective value of the latter against corrosion. Thus small proportions of calcium plumbate in an otherwise not anti-corrosive pigment mixture have been found to confer anti-corrosive properties.

Whereas calcium plumbate as generally prepared has a buff colour, a modified form of calcium plumbate having a substantially white colour can be prepared, according to the invention, by adding to the mixture of lead oxide and calcium oxide before furnacing a small proportion of the order of 0.5% to 5.0% of powdered silica and furnacing at a temperature of about 700° C. At lower temperatures the reaction is unduly slow, while if the temperature is too high the resulting product tends to have a brown colour.

A white calcium plumbate pigment can also be obtained by employing an excess of calcium oxide during the heating operation.

Pigments so made can then be made into paints having a high obliterating power and good weathering properties which are specially suitable for protective purposes when applied to bare iron or steel.

Owing to the high protective power of these plumbate pigments and their great opacity in oil vehicles they can be used with advantage with large amounts of extender pigments to produce cheaper paints of good protective value and considerable hiding power. Some extenders may be produced in admixture with the plumbate as the result of the heating operation, these either arising from incomplete decomposition of the salt of the alkaline earth metal or being added during or prior to the heating operation. Other extenders are more suitably admixed with the plumbate after the production thereof, e. g. during or after incorporation of the plumbate in a suitable vehicle.

Paints according to the invention, in addition to affording good protection for iron and steel against atmospheric conditions, also give excellent protection in the severe conditions of intermittent alternate immersion in fresh or salt water and exposure to the air.

The following are typical examples of the manufacture of alkali metal plumbates containing substantially the whole of the lead in the form of combined $PbO_2$.

I. CALCIUM PLUMBATE 7 parts by weight of commercial hydrated lime were heated in air with 10 parts by weight of litharge to 700° C. for 8 hours. The resulting fine powder was suitable for direct incorporation in a paint.

II. BARIUM PLUMBATE (a) *From mixtures containing 2 molecular proportions of barium oxide to 1 of lead oxide.*

17.6 parts by weight of commercial precipitated barium carbonate were heated in air with 10 parts by weight of litharge at 750° C. for 8 hours.

The resulting product was in the form of a black friable cake which when ground gave a product suitable for incorporation in a paint.

(b) *From mixtures containing equimolecular proportions of barium oxide and lead oxide.*

8.8 parts by weight of commercial precipitated barium carbonate were heated in air with 10 parts by weight of litharge at 750° C. for 8 hours.

The resulting product was in the form of a black friable cake which when ground gave a product suitable for incorporation in a paint.

The following are examples of typical paints according to the invention:

*Example 1*

The paint consists of 70 parts by weight of calcium plumbate mixed with 30 parts by weight of a vehicle made up of:

| | Parts by weight |
|---|---|
| Refined linseed oil | 47½ |
| Pale boiled linseed oil | 47½ |
| Cobalt naphthenate liquid driers | 5 |

*Example 2*

The paint consists of 64 parts by weight of calcium plumbate mixed with 36 parts by weight of a vehicle made up to contain:

| | Parts by weight |
|---|---|
| Linseed stand oil (30 poises) | 34 |
| Pale boiled linseed oil | 25.5 |
| Mineral spirit | 33.8 |
| Cobalt naphthenate liquid driers | 5.8 |
| Aluminium stearate | 0.9 |
| | 100 |

*Example 3*

Barium plumbate 70 parts by weight mixed with 30 parts by weight of a vehicle made up of:

| | Parts by weight |
|---|---|
| Linseed stand oil (30 poises) | 34 |
| Pale boiled linseed oil | 25.5 |
| Mineral spirit | 33.8 |
| Cobalt naphthenate liquid driers | 5.8 |
| Aluminium stearate | 0.9 |

*Example 4*

Barium plumbate paint with 30% barium carbonate as extender in the pigment. The extender being introduced in the furnacing operation.

The paint consists of:

| | Parts by weight |
|---|---|
| Barium plumbate | 49 |
| Barium carbonate | 21 |
| Vehicle | 30 |

The vehicle is of the same composition as that used in Example 2.

*Example 5*

Example of use of calcium plumbate in mixture with another pigment to improve its rust inhibitive qualities.

The paint consists of:

| | Parts by weight |
|---|---|
| Red iron oxide | 55.2 |
| Calcium plumbate | 13.8 |
| Vehicle | 31 |

The vehicle consists of:

| | Parts by weight |
|---|---|
| Refined linseed oil | 42 |
| Pale boiled linseed oil | 42 |
| Mineral spirit | 6.3 |
| Cobalt naphthenate liquid driers | 9.7 |

*Example 6*

Example of calcium plumbate paint with 20% barytes as extender in the pigment, the barytes being added during the paint making operation.

The paint consists of:

| | Parts by weight |
|---|---|
| Calcium plumbate | 51.2 |
| Barytes (paint making quality) | 13.0 |
| Vehicle | 35.8 |

The vehicle is of the same composition as that used in Example 2.

What I claim as my invention and desire to secure by Letters Patent is:

1. An anti-corrosive oil paint comprising as a vehicle constituent a glyceride drying oil and as a pigment constituent, a plumbate of an alkaline earth metal in which substantially the whole of the lead is present as lead peroxide combined with an alkaline earth metal oxide.

2. An anti-corrosive paint comprising, in admixture, glyceride drying oil vehicle and a plumbate of an alkaline earth metal in which at least 90% by weight of the lead is present as lead peroxide combined with an alkaline earth metal oxide.

3. An anti-corrosive paint comprising, in admixture, glyceride drying oil vehicle, a plumbate of an alkaline earth metal in which at least 90% by weight of the lead is present as lead peroxide combined with an alkaline earth metal oxide and another pigment.

4. An anti-corrosive oil paint comprising as a vehicle constituent a glyceride drying oil and as a pigment constituent an admixture of barium plumbate and barium carbonate, at least 90% of the lead in said barium plumbate being present as lead peroxide combined with barium oxide.

5. An anti-corrosive oil paint comprising as a vehicle constituent a glyceride drying oil and as a pigment constituent an admixture of calcium plumbate and barytes, at least 90% of the lead in said calcium plumbate being present as lead peroxide combined with calcium oxide.

6. An anti-corrosive oil paint comprising as a vehicle constituent a glyceride drying oil and as a pigment constituent an admixture of an alkaline earth metal plumbate and iron oxide, at least 90% of the lead in said plumbate being present as lead peroxide combined with an alkaline earth metal oxide.

7. An anti-corrosive paint comprising, in admixture, a linseed oil vehicle and a plumbate of an alkaline earth metal in which at least 90% by weight of the lead is present as lead peroxide combined with an alkaline earth metal oxide.

8. An anti-corrosive oil paint as defined in claim 2 in which the pigment constituent is white calcium plumbate obtained by heating lead oxide with an excess of calcium oxide in air at a temperature of about 700° C.

9. An anti-corrosive oil paint as defined in claim 2 in which the pigment constituent is a white calcium plumbate obtained by heating lead oxide and calcium oxide in air at a temperature of about 700° C. in the presence of a small proportion, of the order of 0.5% to 5%, of powdered silica.

NORMAN JOHN READ.